Nov. 20, 1962　　　　A. M. SPOUND　　　　3,065,023
RECLINING SEAT CONSTRUCTION
Filed Sept. 8, 1960　　　　　　　　　　　　　2 Sheets-Sheet 1

INVENTOR
ALBERT M. SPOUND

ATTORNEY

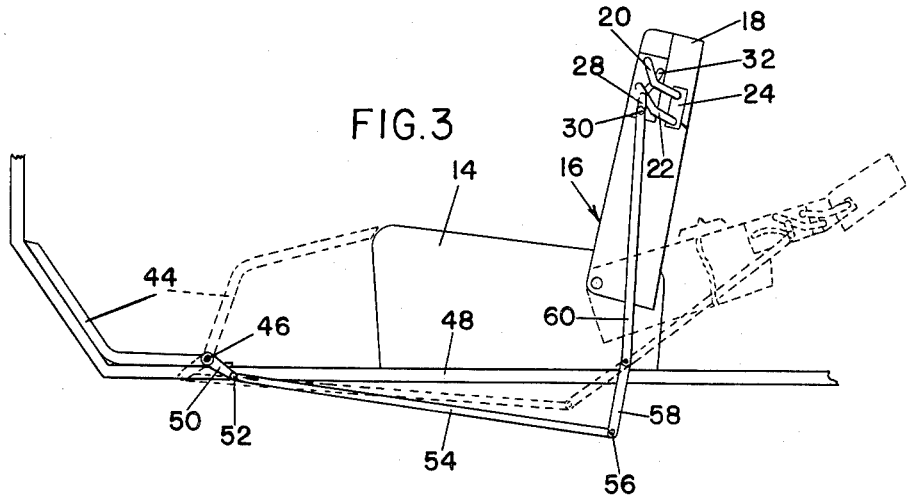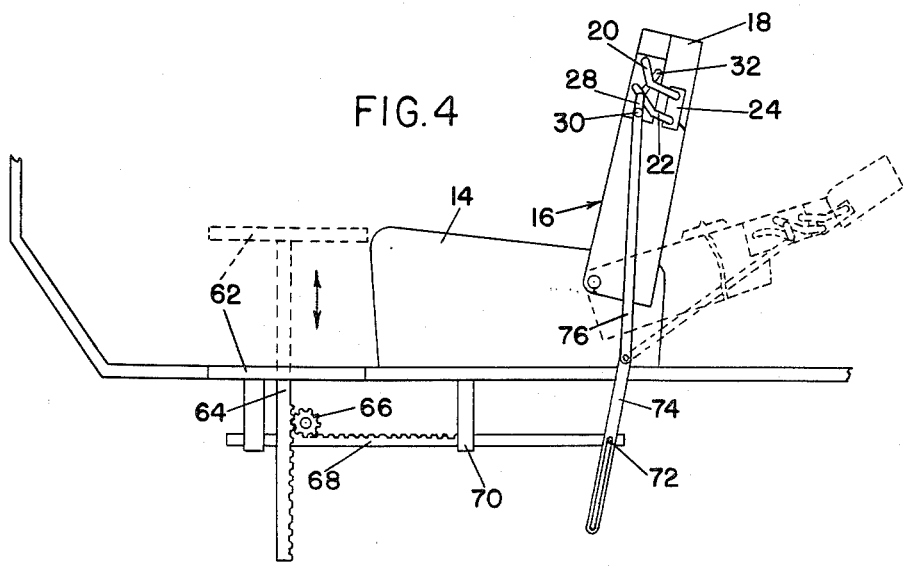

United States Patent Office 3,065,023
Patented Nov. 20, 1962

3,065,023
RECLINING SEAT CONSTRUCTION
Albert M. Spound, Wellesley Hills, Mass.
(% Charlton Co., Fitchburg, Mass.)
Filed Sept. 8, 1960, Ser. No. 54,706
4 Claims. (Cl. 297—61)

This invention relates to reclining seat constructions particularly adapted for vehicles, and the principal object of the present invention resides in the provision of a seat which is relatively fixed and has a reclining backrest to provide for a sitting up position or selectively a reclining or sleeping position, in combination with an adjustable footrest member which can be pivoted from a substantially inutile position where it is not noticed or in the way to a position where a portion thereof substantially adjoins the forward portion of the fixed seat so that when the occupant reclines he is also provided with a leg rest member instead of, as with the conventional reclining car seat, being forced to let his feet and lower legs dangle at the front part of the fixed seat even though reclining or sleeping.

Another object of the invention resides in the provision of a seat as above described having means for moving the footrest from inutile to utile position automatically upon motion of the backrest toward the reclining position; further in combination with an automatically projectable headrest construction providing a pillow-like member for the sleeper or recliner, said headrest being normally concealed in a low-back backrest.

Other objects and advantages of the invention will appear hereinafter.

Reference is to be had to the accompanying drawings, in which

FIG. 3 is a similar view showing a modification; and

FIG. 4 is a view similar to FIG. 3 showing a further modification.

Reference is made to U.S. Patent No. 2,884,992 issued May 5, 1959 wherein there is shown and described a low-back reclining chair having an automatically projectable headrest and the projectable headrest of the present invention is made similarly thereto.

Figure 1:
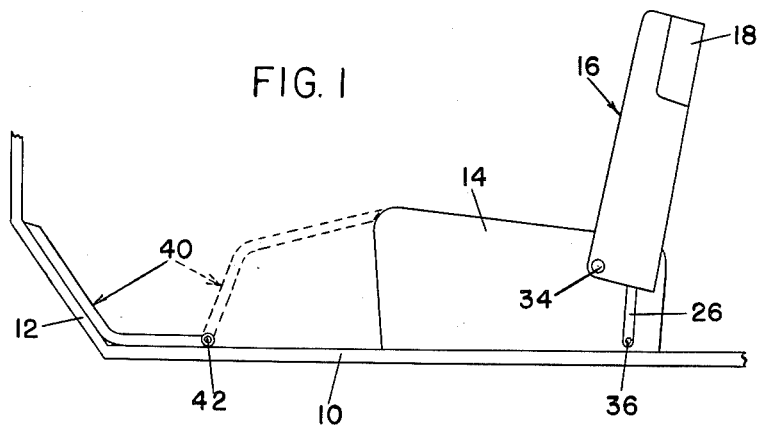
FIG. 1 is a diagrammatic view illustrating a form of the invention and showing the backrest in seating position.

Referring now to FIG. 1, the reference numeral 10 indicates in general the floor of a vehicle such as an automobile. At the forward end portions of such floor, there is ordinarily a member or members such as at 12 which extends at an incline upwardly and forwardly and through this member the controls of the vehicle may extend, such controls not being shown, as they are common and well known in the art.

The reference numeral 14 indicates the usual and conventional front seat which may be adjustable up and down or forward and back or even in a tilting direction as is common in the art, but when the seat is being used it is fixed relative to the floor 10.

There is a backrest which is indicated generally at 16 and this backrest is substantially the equivalent of that disclosed in the above identified patent and appears just as any conventional seat back as in an automobile. It is provided with an automatically projecting headrest 18 and this headrest is projected by means of a pair of parallel links 20, 22 which are pivoted as for instance by a plate or the like 24 to the headrest 18 and cause the same to project to the FIG. 2 position and to return to concealed position as in FIG. 1.

The parallel linkage 20, 22 may be actuated by a driving rod or the like 26 which is connected to one of the levers as 22 in any operative way desired as by link 28 and usually there is a guide pin 30 which travels in a slot 32 in a bracket or plate member provided for the purpose, all substantially as described in the patent above referred to. A spring may be used to resist rearward motion.

The effect of this construction is that the backrest 16 provides perfect comfort and support when the occupant is seated. Merely by pushing to the rear the backrest 16 pivots about its pivot which is indicated herein at 34 and as it does so, the driving rod 26, pivoted at 36 at a fixed location, gradually extends upwardly relatively speaking with respect to the backrest and actuates the parallel linkage 20, 22 from a down position as in FIG. 1 to an upper position as in FIG. 2 and in so doing, the headrest 18 is brought from the FIG. 1 position to the FIG. 2 position.

One distinction of the present invention over that shown in the above identified patent is a variation in the extent to which the seat may incline, and in the present case the seat is adapted to incline further toward the sleeping position than in the patent above referred to more closely approximate a bed. However, it is pointed out that it is not at all necessary to have the seat 14 and the backrest 16 coplanar, as it is very comfortable for sleeping when the head is supported on the headrest 18 in the position shown in FIG. 2, wherein the entire apparatus clears the rear seat 38, if there is a rear seat. Thus it will be seen that this construction provides a car seat far more comfortable for sleeping while traveling than is the case where the backrest is adapted to merely form a coplanar arrangement with the back seat.

However, this invention also contemplates the use of a footrest which is generally indicated at 40. One way of providing this footrest is to make it in the form of an angle member as shown in FIGS. 1 and 2 having a pivot point 42 so that the member 40 may be normally positioned by gravity as in FIG. 1 generally parallel to the floor part 12 completely out of the way and in fact unnoticeable.

Figure 2:
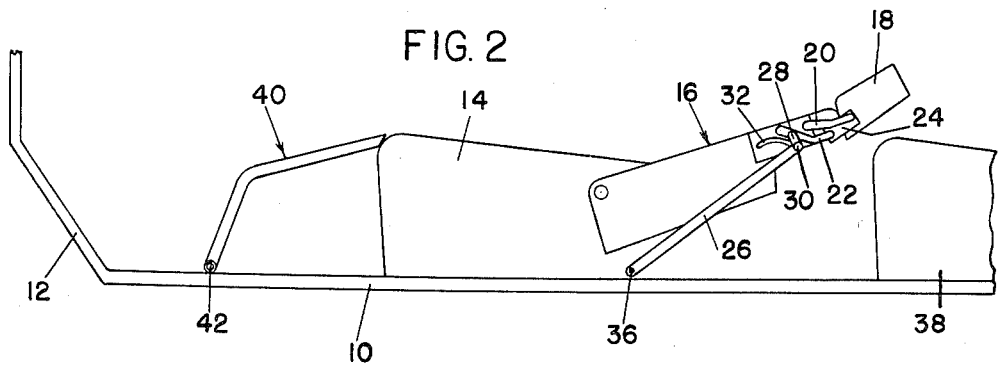
FIG. 2 is a similar view showing the backrest in utile position.

However when the backrest is pushed to be used for reclining or sleeping, the footrest may be pivoted up and around on its pivot 42 to the dotted line position of FIG. 1 and solid line position of FIG. 2. This member will extend across the seat as far as desired for one passenger and forms a very comfortable leg rest so that the passenger is completely supported above the floor of the car and does not have to dangle the feet and lower limbs over the front edge of seat 14, as in conventional seats.

Referring now to FIG. 3 there is shown a means for projecting the legrest which is herein indicated at 44 and is pivoted at 46 relative to the floor 48. A fixed downwardly projecting member 50 is provided and this is pivoted at 52 to a relatively long bar 54 which in turn is pivoted at 56 to a downward extension 58 on the driving rod 60 which otherwise is substantially the same as at 26, all of the other backrest constructions beign as shown in FIGS. 1 and 2.

When the backrest 16 in FIG. 3 is moved to the rear as shown in dotted lines, part 58 will of course move in a clockwise direction, i.e., to the left in FIG. 3, thus moving rod 54 and member 50, the latter flipping over the foot rest 44 to the dotted line position.

This may be done in other ways also as for instance see FIG. 4 wherein there is an elevator type of foot rest 62 mounted on a standard 64 which may be toothed and in mesh with a fixed position spur gear at 66, the spur gear in turn meshing with a rack 68 supported in a bracket 70. Rack 68 may be pivoted as at 72 to the extension 74 of the driving rod 76 which otherwise and again is the same as that at 26 in FIGS. 1 and 2. In FIG. 4, as the driving rod 76 pivots to the right, extension 74 moves to the left and a rectilinear motion derived therefrom as to rack 68 causes spur gear 66 to rotate in a direction to elevate the platform 62 which rises to the dotted line position and acts as the foot and leg rest as above described.

In vehicles utilizing a rear seat, it is well understood in the art that the top of the front seats have to be relatively low to allow the occupant of the rear seat a view through the windshield over the tops of the front seats and for this reason any headrest provided for the front seats of vehicles have always been detachable so that when not in use they do not obstruct the view of those in the rear seat. Therefore it will be seen that the automatically projecting headrest of the present case, being normally concealed and completely out of the way and usable in a low back seat, is peculiarly adaptable to the front seat of a vehicle and particularly to the seat of the passenger. It is usable for the driver also because by a differentiation in the length of the driving rod 26 it is possible to cause the headrest 18 to move up upon a very slight motion of the backrest so that the driver may rest his head if he desires to while driving, with but a very slight push of the back of the seat.

Having thus described my invention and the advantages thereof, I do not wish to be limited to the details herein disclosed, otherwise than as set forth in the claims, but what I claim is:

1. A device of the class described comprising a fixed seat and a movable backrest therefor, means providing for motion of said backrest from a generally upright sitting condition to a rearwardly inclined position, a footrest for said fixed seat, said footrest having a normally out-of-the-way position, means separate from the seat and mounting said footrest for moving the same into general juxtaposition with said fixed seat, and means operating said footrest from one position to the other, said means being connected to and being actuated by said backrest in its motion from one position to the other, said footrest being generally rectilinearly movable in front of the seat.

2. A device of the class described comprising a floor, a fixed seat on the floor, and a movable backrest for the seat, means providing for motion of said backrest from a generally upright sitting condition to a rearwardly inclined position, a footrest for said fixed seat, said footrest having a normally out-of-the-way inutile position on the floor, means mounting said footrest for moving the same into general conformance with said fixed seat in extension thereof, means operating said leg rest from inutile to utile position, said last-named means being connected to and actuated by said backrest in its motion from one position to the other, and comprising a rod connected to the footrest, a second rod connected to the backrest and having a fixed pivot, said second rod pivoting under influence of the backrest and moving said first named rod in a generally rectilinear manner to actuate the footrest.

3. An adjustable seat construction of the class described comprising a floor, a fixed seat thereon, a swinging backrest, a projectable headrest on the backrest, means automatically projecting the headrest from a position partially within the backrest to exposed useful condition in juxtaposition to the top edge of the backrest, and a foot rest mounted on the floor, said foot rest being movable from an out-of-the-way position on the floor when the seat is used as a seat, to a leg rest position general in line with the top of the seat when the backrest is moved to reclining position.

4. The adjustable seat construction of claim 3 including means to move the footrest, and means connected to and actuated by the headrest projecting means to actuate the footrest moving means.

References Cited in the file of this patent
UNITED STATES PATENTS

| | | |
|---|---|---|
| 467,756 | Sandburg | Jan. 26, 1892 |
| 1,140,931 | Wright | May 25, 1915 |
| 1,212,675 | Pettyjohn | Jan. 16, 1917 |
| 1,936,942 | Koenigkramer et al. | Nov. 28, 1933 |
| 2,326,910 | Young | Aug. 17, 1943 |
| 2,815,794 | Hendrickson et al. | Dec. 10, 1957 |

FOREIGN PATENTS

| | | |
|---|---|---|
| 570,199 | France | Jan. 14, 1924 |
| 679,644 | France | Jan. 13, 1930 |